(12) United States Patent
Falkenborg

(10) Patent No.: US 8,567,241 B2
(45) Date of Patent: Oct. 29, 2013

(54) ADAPTER INCORPORATING A TPMS ONTO A TRUCK TIRE VALVE

(76) Inventor: William C. Falkenborg, Tujunga, CA (US)

(*) Notice: Subject to any disclaimer, the term of this patent is extended or adjusted under 35 U.S.C. 154(b) by 0 days.

(21) Appl. No.: 13/369,113

(22) Filed: Feb. 8, 2012

(65) Prior Publication Data

US 2012/0137763 A1 Jun. 7, 2012

Related U.S. Application Data

(63) Continuation-in-part of application No. 12/799,965, filed on May 6, 2010, now abandoned.

(51) Int. Cl.
*B60C 23/02* (2006.01)

(52) U.S. Cl.
USPC .......................................... 73/146.8

(58) Field of Classification Search
USPC ................................ 73/146–146.8
See application file for complete search history.

(56) References Cited

U.S. PATENT DOCUMENTS

| | | | |
|---|---|---|---|
| 4,117,281 A | | 9/1978 | Leimbach |
| 4,531,473 A | * | 7/1985 | Winther ..................... 116/34 R |
| 4,819,685 A | | 4/1989 | Pagani |
| 5,774,048 A | | 6/1998 | Achterholt |
| 5,987,980 A | | 11/1999 | Mangafas et al. |
| 6,005,480 A | | 12/1999 | Banzhof et al. |
| 6,799,455 B1 | | 10/2004 | Neefeldt et al. |
| 7,284,419 B2 | * | 10/2007 | Rutherford ................. 73/146.8 |
| 7,624,752 B2 | | 12/2009 | Huang |
| 2002/0124637 A1 | * | 9/2002 | Saheki et al. ................... 73/146 |
| 2007/0295076 A1 | * | 12/2007 | Blossfeld et al. ............ 73/146.8 |
| 2012/0118057 A1 | * | 5/2012 | Rigney et al. ............... 73/146.8 |

* cited by examiner

*Primary Examiner* — Andre Allen
(74) *Attorney, Agent, or Firm* — Albert O. Cota

(57) ABSTRACT

An adapter assembly for attaching a tire pressure monitor onto an inflation valve which incorporates a distal end flange. An adapter is included in the assembly that consists of a collar having a configuration sized to fit over and be internally retained by the valve distal end flange. An O-ring is positioned on the flange contiguously engaging the collar. A tire pressure monitoring cap is threadably attached to the collar which is disposed above and compresses the O-ring between the cap, collar and valve end flange. The adapter permits the tire pressure monitor to be attached, for use with a Tire Pressure Monitoring System (TPMS) and also prevents minor air leaks. A fourth embodiment incorporates an outward-extending integral arm formed with the collar for mounting the TPMS sensor on the drop center of the wheel.

7 Claims, 7 Drawing Sheets

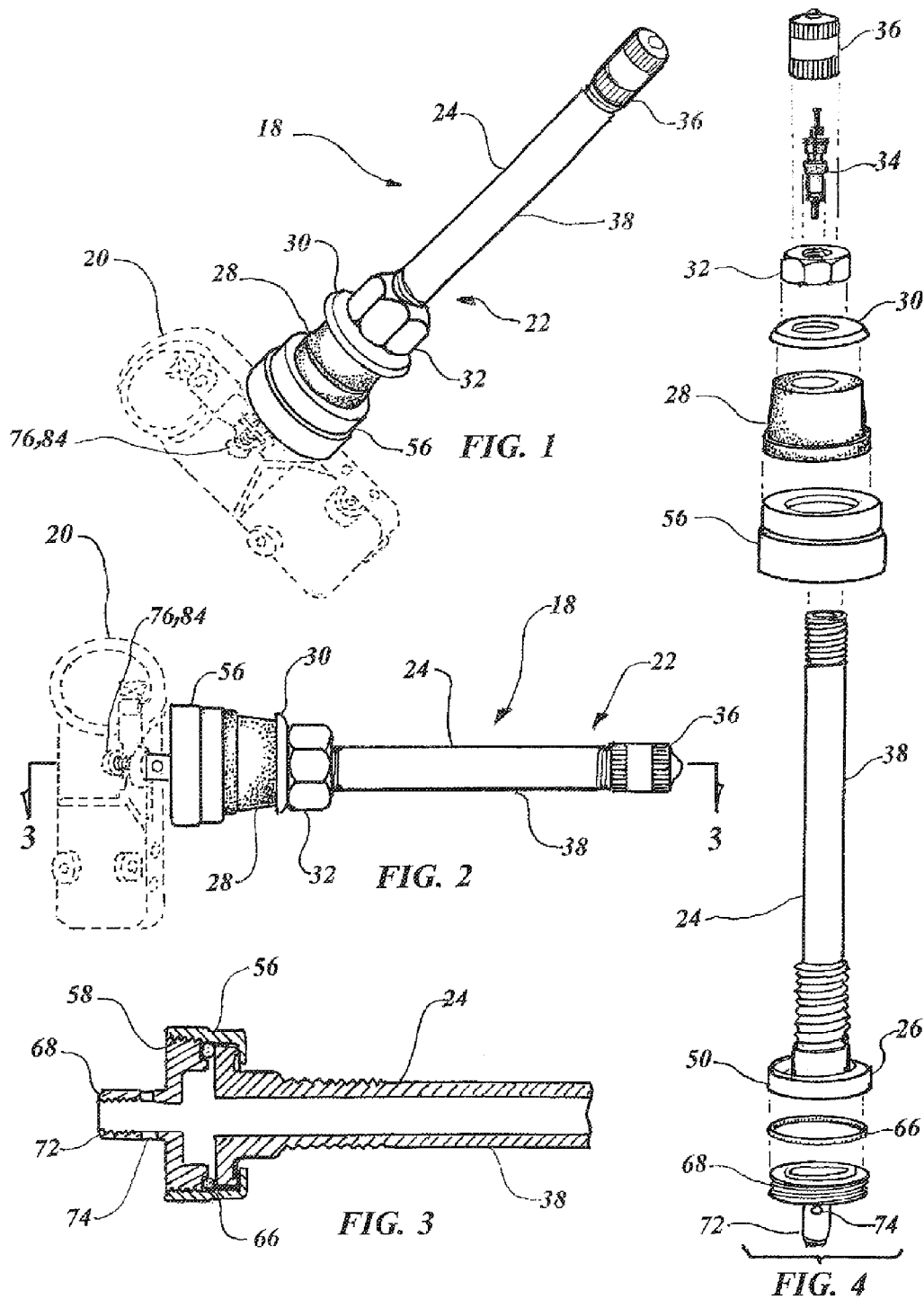

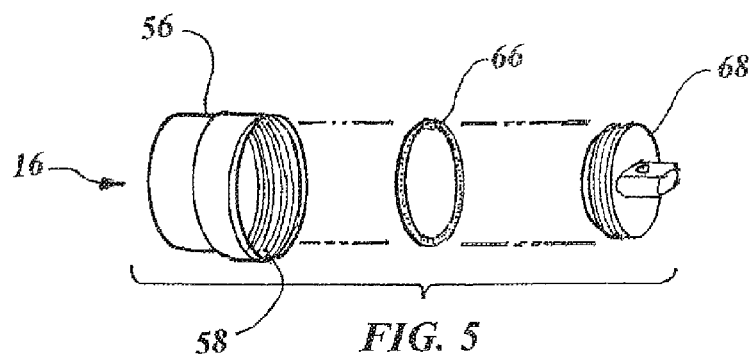
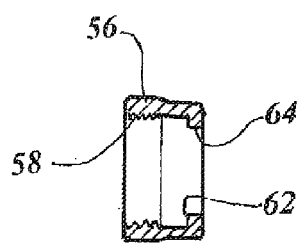
FIG. 6
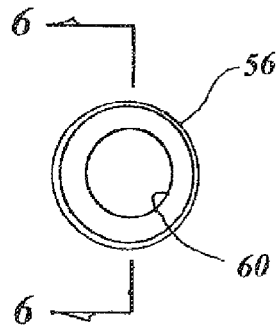
FIG. 7
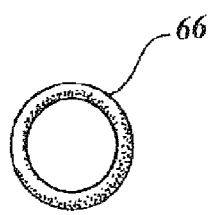
FIG. 8
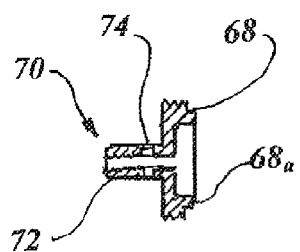
FIG. 9
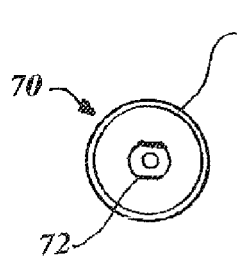
FIG. 10
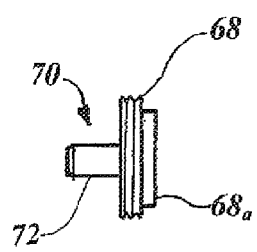
FIG. 11
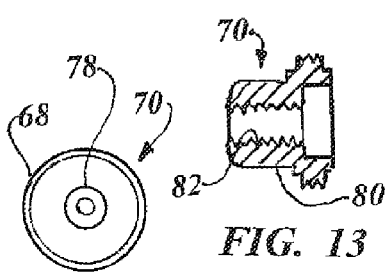
FIG. 12 FIG. 13
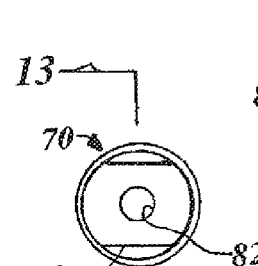
FIG. 14
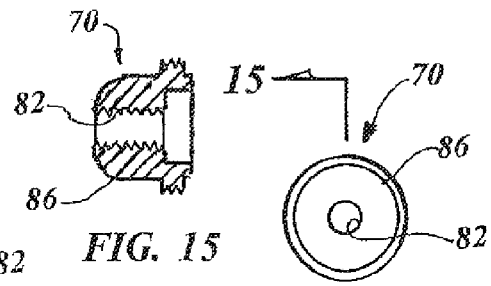
FIG. 15 FIG. 16

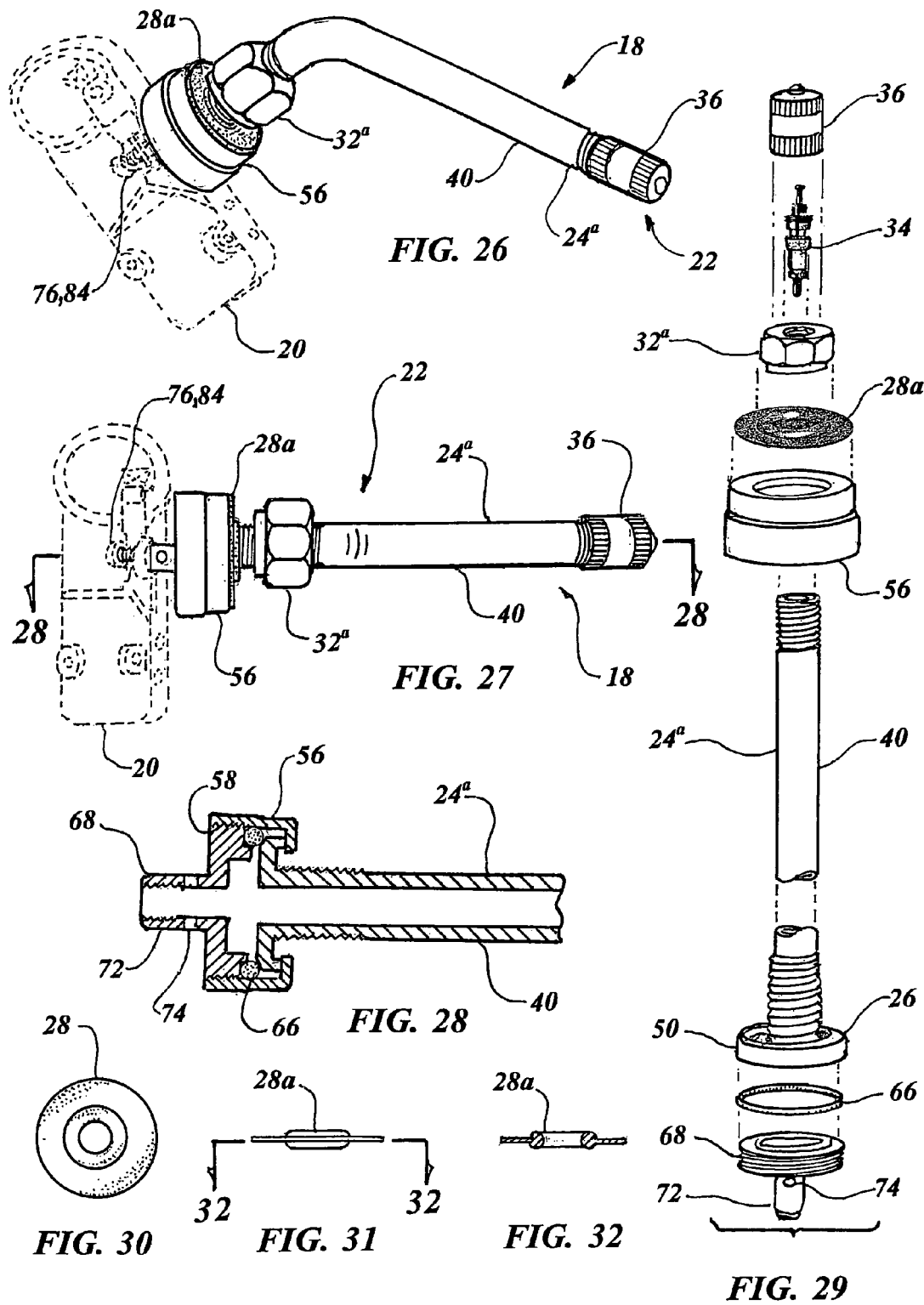

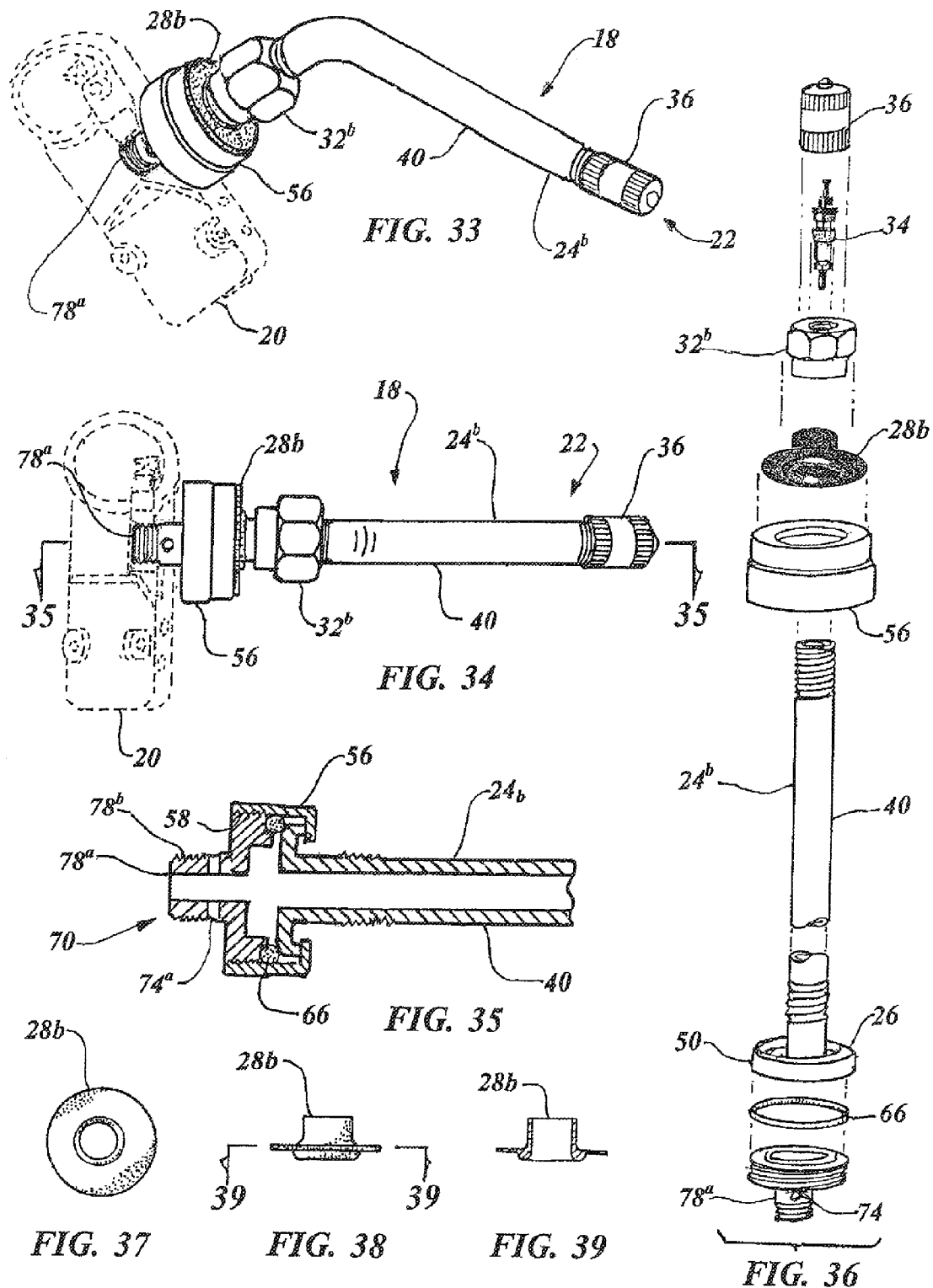

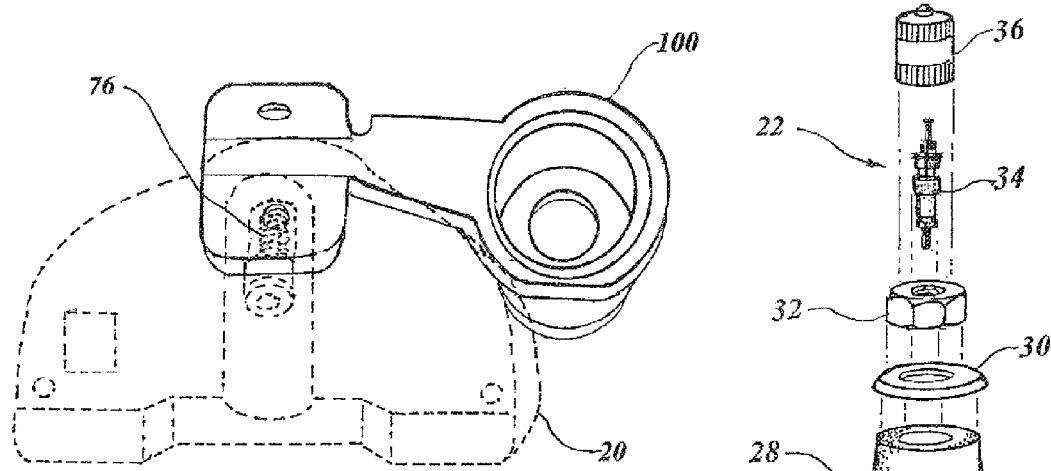
FIG. 40
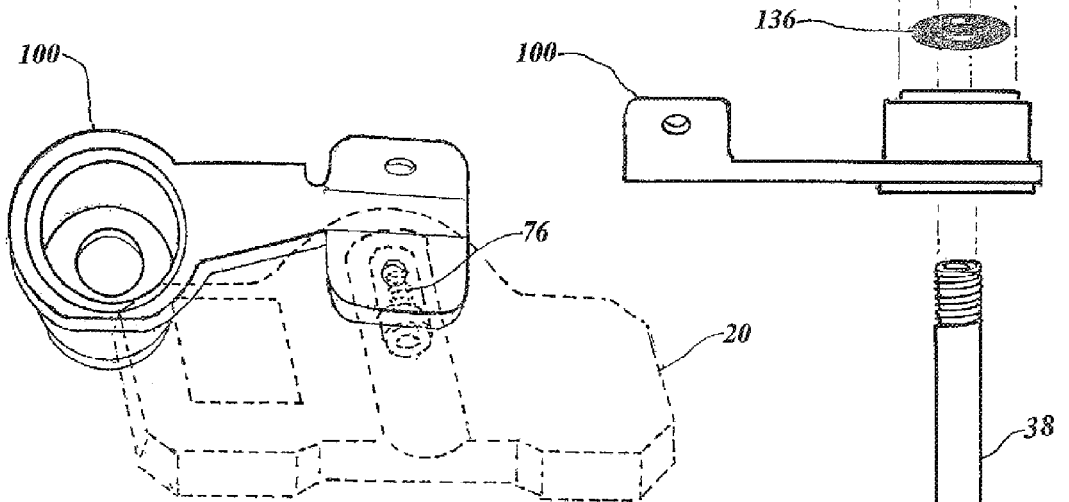
FIG. 41
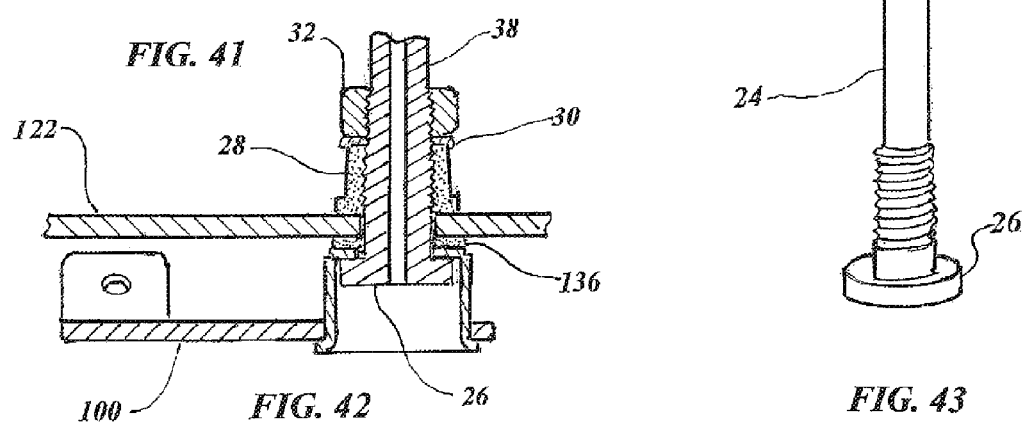
FIG. 42
FIG. 43

ADAPTER INCORPORATING A TPMS ONTO A TRUCK TIRE VALVE

This application is a continuation-in-part (CIP) of application Ser. No. 12/799,965 filed May 6, 2010 now abandoned.

TECHNICAL FIELD

The invention generally pertains to adapters, and more specifically to an adapter that includes a Tire Pressure Monitoring System (TPMS) that functions is combination with a conventional aluminum or steel wheel truck tire inflation valve.

BACKGROUND ART

Previously, many types of tubeless tire inflation valves have been used to provide an effective means for attaching a wheel rim and integrally mount a sensor for a TPMS.

The prior art listed below did not disclose patents that possess any of the novelty of the instant invention; however the following U.S. patents are considered related:

| Pat. No. | Inventor | Issue Date |
|---|---|---|
| 4,117,281 | Leimbach | Sep. 26, 1978 |
| 5,774,048 | Achterholt | Jun. 30, 1998 |
| 5,987,980 | Mangafas et al. | Nov. 23, 1999 |
| 6,005,480 | Banzhof et al. | Dec. 21, 1999 |
| 6,799,455 | Neefeldt et al. | Oct. 5, 2004 |
| 7,624,752 | Huang | Dec. 1, 2009 |

Leimbach in U.S. Pat. No. 4,117,281 teaches a device for applying air to a tire which activates a warning device when internal pressure falls below a predetermined value. The device has a valve stem, a core and a diaphragm actuated electrical switch which signals when tire pressure is below a predetermined value.

Achterholt in U.S. Pat. No. 5,774,048 discloses a valve which generates a signal representing a pressure drop in a vehicle tire. A pressure sensor and microprocessor is provided which stores a value of the pressure in a memory and compares pressure, sending a signal to a monitor periodically.

Mangafas et al. in U.S. Pat. No. 5,987,980 teaches a sensing device that includes a tire valve having a pressure sensor and transponder that is removable from the valve stem. The device is electrically connected to the conductive portion of the tire valve via a receptacle that facilitates an antenna system for radio frequency communication with the device.

U.S. Pat. No. 6,005,480 issued to Banzhof et al. discloses a tire pressure radio-frequency sending unit mounted to a snap-in resilient valve body with a column extending from the sending unit. The column includes a central passageway that facilitates the insertion of the sending unit using standard insertion tools.

Neefeldt et al. in U.S. Pat. No. 6,799,455 discloses a tire pressure monitor continuously indicating when a tire is adequately inflated for safe operation. The monitor includes an indicator associated with each tire indicating which tire is safe. The monitor includes a battery operated pressure sensitive radio frequency transmitter mounted on the outer end of a tire valve stem and includes an antenna extending into each tire for transmitting a signal. The signal transmitted actuates only the indicator associated with the signal from only the transmitter assigned to a particular tire.

U.S. Pat. No. 7,624,752 issued to Huang discloses an inflation valve having two chambers and a central pin assembly mounted in an air inlet connector. When a tire is excessively inflated, the valve automatically releases surplus air via at least one pod in a second chamber by pushing a first valve body and a second valve body upward.

For background purposes and as indicative of the art to which the invention is related reference may be made to the remaining cited patent issued to Pagani in U.S. Pat. No. 4,819,685.

DISCLOSURE OF THE INVENTION

Tire Pressure Monitoring Systems (TPMS) are in current use in automobile and truck applications. Automobile applications typically utilize resilient-snap-in tire valves having a valve body surrounded in part with a resilient element that forms an annular sealing surface around an opening in the wheel rim.

Truck and industrial off-road applications differ in that dual wheels, and the like, require longer valve stems typically made of metal. Additionally, hand-bendable or flexible extensions can also be utilized. While many trucks include a TPMS as original equipment, there are replacements which use a myriad of different monitors according to the requirement of the vehicle's electronic control module.

The problem that has existed for some time is that vehicle dealers are required to stock each type of inflation valve with a varied combination of monitors along with valves without a monitor. Therefore, the primary object of the invention is to provide a simple, relatively inexpensive adapter that converts a conventional tire valve into the type that incorporates the proper interface for attachment of a TPMS. The use of this novel adapter alleviates the burden of stocking considerable quantities of individual items.

An important object of the invention is that are there basically four types of interface configurations in common usage. The first type is comprised of an integral round hollow stem flattened on opposed sides and having a lateral air egress hole therethough and screw threads. The threads are located within the hollow of the stem on a distal end for mounting a monitor with a threaded fastener. The second type is the same as the first less the flats. The third type incorporates a hollow radial dome with threads in the hollow for adjustable attachment and includes wrench flats on opposed sides. The fourth type is the same as the third less the wrench flats.

There are also many different types of tire inflation valves for mounting in truck and specialized vehicle tires. The basic concept of the invention is adaptable to most inflation valve types as long as they have a distal end flange that is mounted inside the truck wheel. The invention is specifically utilized for industry standard Series 500, 540 and 550 tire inflation valves using a grommet which is either a commercially available type or an aftermarket type. The aftermarket type includes the OEM basic design with improvements enhancing the sealing ability of the inflation valve itself.

Another object of the invention is that the only requirement needed for a tire inflation valve is that the valve have a distal end flange which is typically located on the majority of valves available on the market today. No other elements are required as the adapter collar simply slides over the stem and engages the inner surface of the flange. An O-ring is placed over the outer surface of the flange within the collar and a tire pressure monitoring cap is threaded into the collar. The cap incorporates the proper interface mounting attachment for the monitor, and therefore is easily attached using the threaded fastener hardware included with each monitor.

Still another object of the invention is the utilization of an O-ring which creates a secondary sealing function in the event the grommet on the valve produces a leak path from ambient to the pressurized area of the tire.

Yet another object of the invention is that the flange on the valve may have a number of different outer shapes, such as hexagonal, polygonal, etc. as well as the preferred conventional round configuration.

A further object of the invention is that the adapter may be employed with not only new valves but existing valves may be easily reused.

In the fourth embodiment of the invention, the collar includes an integral arm having two mounting pads to accommodate a different TPMS monitor. The arm may be installed in a lateral position on either side of the collar, thereby utilizing only a single arm which can be used on either steel or aluminum tire wheels. The fourth embodiment is a simple one piece device with a modified aftermarket grommet located between the collar and the wheel. The monitor is installed on an appropriate mounting pad with the furnished threaded fastener, making the installation easy and straightforward in a variety of combinations.

These and other objects and advantages of the present invention will become apparent from the subsequent detailed, description of the preferred embodiment and the appended claims taken in conjunction with the accompanying drawings.

BRIEF DESCRIPTION OF THE DRAWINGS

FIG. 1 is a partial isometric view of the valve with the adapter assembly in the preferred embodiment. The tire pressure monitor is shown in broken lines as it is not part of the claimed invention.

FIG. 2 is a top elevation view of the valve with the adapter assembly in the preferred embodiment. The tire pressure monitor is shown in broken lines as it is not part of the claimed invention.

FIG. 3 is a partial cross-sectional view taken along lines 3-3 of FIG. 2.

FIG. 4 is an exploded partial isometric view of the valve and the adapter assembly in the preferred embodiment.

FIG. 5 is an exploded partial isometric view of the adapter collar, O-ring and monitoring cap.

FIG. 6 is a cross-sectional view taken along lines 6-6 of FIG. 7.

FIG. 7 is a front view of the adapter collar in the preferred embodiment.

FIG. 8 is a plan view of the O-ring.

FIG. 9 is a cross-sectional view taken along lines 9-9 of FIG. 10.

FIG. 10 is a left side view of the tire pressure monitoring cap having an integral protruding round hollow stem with flats.

FIG. 11 is a top elevational view of the tire pressure monitoring cap in the preferred embodiment FIG. 12 is a front view of tire pressure monitoring cap with an integral protruding round hollow stem without flats in the second embodiment.

FIG. 13 is a cross-sectional view taken along lines 13-13 of FIG. 14.

FIG. 14 is a left side view of an alternate third embodiment of the tire pressure monitoring cap having a dome shape with wrench flats located on the dome.

FIG. 15 is a cross-sectional view taken along lines 15-15 of FIG. 16.

FIG. 16 is a left side view of an alternate fourth embodiment of the tire pressure monitoring cap having a dome shape without wrench flats.

FIG. 26 is a partial isometric view of the valve with the adapter assembly in the second embodiment. The tire pressure monitor is shown in broken lines as it is not part of the claimed invention.

FIG. 27 is a top elevation view of the valve with the adapter assembly in the second embodiment. The tire pressure monitor is shown in broken lines as it is not part of the claimed invention.

FIG. 28 is a partial cross-sectional view taken along lines 28-28 of FIG. 27.

FIG. 29 is an exploded partial isometric view of the valve and the adapter assembly in the second embodiment.

FIG. 30 is a top plan view of the aftermarket 540 series grommet.

FIG. 31 is a side view of the aftermarket 540 series grommet.

FIG. 32 is a cross-sectional view taken along lines 32-32 of FIG. 31.

FIG. 33 is a partial isometric view of the valve with the adapter assembly in the third embodiment. The tire pressure monitor is shown in broken lines as it is not part of the claimed invention.

FIG. 34 is a top elevation view of the valve with the adapter assembly in the third embodiment. The tire pressure monitor is shown in broken lines as it is not part of the claimed invention.

FIG. 35 is a partial cross-sectional view taken along lines 35-35 of FIG. 34.

FIG. 36 is an exploded partial isometric view of the valve and the adapter assembly in the third embodiment.

FIG. 37 is a top plan view of the aftermarket 550 series grommet.

FIG. 38 is a side view of the aftermarket 550 series grommet.

FIG. 39 is a cross-sectional view taken along lines 39-39 of FIG. 38.

FIG. 40 is a partial isometric view of the integral arm collar with a monitor attached, as illustrated in broken lines, in the fourth embodiment for use with an aluminum wheel.

FIG. 41 is a partial isometric view of the integral arm collar with a monitor attached, as illustrated in broken lines, in the fourth embodiment for use with a steel wheel.

FIG. 42 is a cross-sectional view taken along an imaginary center line of the integral arm adapter collar in the fourth embodiment.

FIG. 43 is an exploded partial isometric view of the valve and the adapter assembly in the fourth embodiment.

BEST MODE FOR CARRYING OUT THE INVENTION

Figure 17:
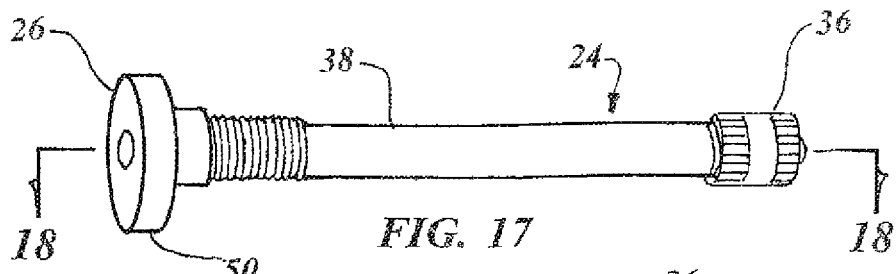
FIG. 17 is a partial isometric view of a typical tire pressure inflation valve having a straight stem.

The best mode for carrying out the invention is presented in terms that disclose a preferred second, third and a fourth embodiment of an adapter incorporating a Tire Pressure Monitoring System (TPMS) onto a truck tire valve. The embodiments are for use with the industry standard 500 series tire inflation valve, as shown in FIGS. 1 through 11 and that are comprised of an adapter 16, as shown in FIGS. 5 through 11, that includes a tire pressure monitor 20 onto a tire inflation valve 22, as shown in FIGS. 17 through 25.

The tire pressure inflation valve 22, in combination with the adapter 16, completes an adapter assembly 18, as depicted in FIGS. 1 through 4. The tire pressure inflation valve 22 is the type in common use with aluminum or steel wheels and is comprised of a hollow metallic valve stem 24 with a distal end flange 26, a resilient grommet 28, a dished washer 30, a hex nut 32, an air valve core 34, and a valve cap 36 attached to the proximal end of the valvestem 24, as best illustrated in the exploded view of FIG. 4.

Figure 18:
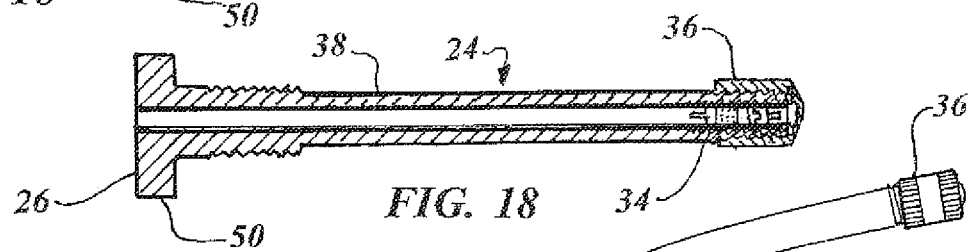
FIG. 18 is a cross-sectional view taken along lines 18-18 of FIG. 17.
Figures 19, 20:
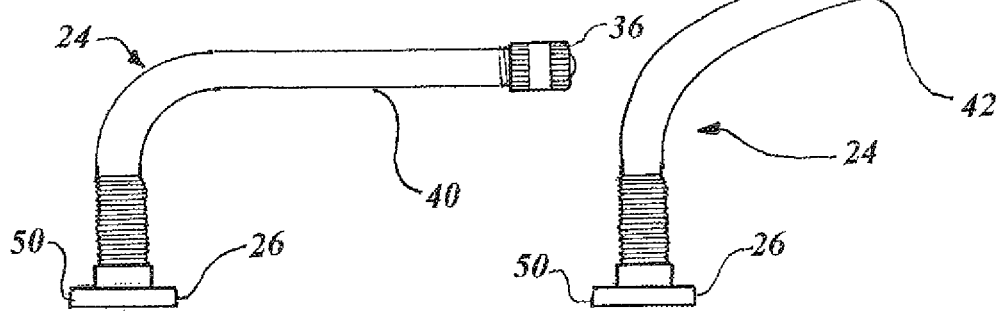
FIG. 19 is a front view of a typical tire pressure inflation valve stem having an angled distal end flange.
FIG. 20 is a front view of a typical tire pressure inflation valve stem having a curved distal end flange.
Figure 21:
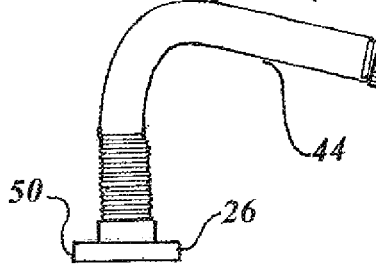
FIG. 21 is a front view of a typical tire pressure inflation valve stem having a hook shaped distal end flange
Figure 22:
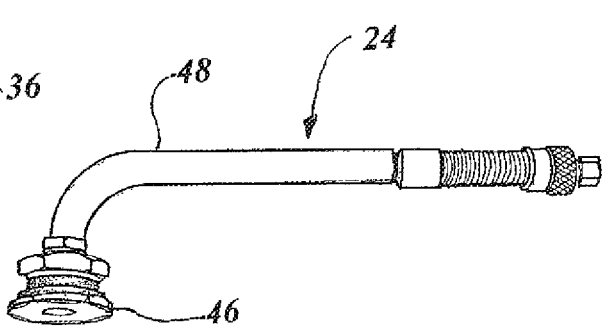
FIG. 22 is a partial isometric view of a typical tire pressure inflation valve assembly having a rim spud with a distal end flange, and utilized in combination with a bent swivel valve.

The tire pressure inflation valve stem 24 may include any of a variety of configurations, but not limited to: a straight stem 38, as illustrated in FIGS. 17 and 18; an angled stem 40, as shown in FIG. 19; a curved stem 42, as shown in FIG. 20; and a hook shaped stem 44, as shown in FIG. 21. The stems 38-44 preferably have a length from 2.00 inches (5.08 cm) to 9.25 inches (23.50 cm) and a hollow bore with an inner diameter ranging from 0.19 inches (0.48 cm) to 0.44 inches (1.12 cm), however other lengths, configurations and dimensions still fall within the scope of the claims. It is also possible to utilize a rim spud 46 and a single bend swivel valve 48 for the larger size 0.051 inches (0.130 cm) hole in industrial applications, as illustrated in FIG. 22.

Figure 23:
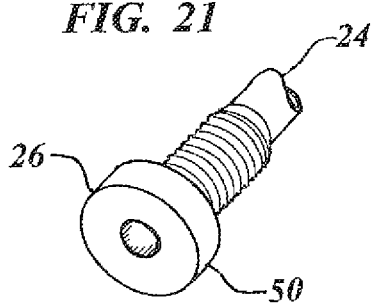
FIG. 23 is a fragmentary isometric view of a typical tire pressure inflation valve stem having a round distal end flange.
Figure 24:
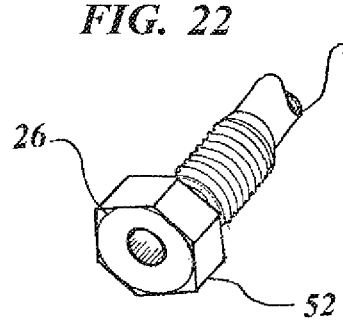
FIG. 24 is a fragmentary isometric view of a typical tire pressure inflation valve stem having a hexagonal shaped distal end flange.
Figure 25:
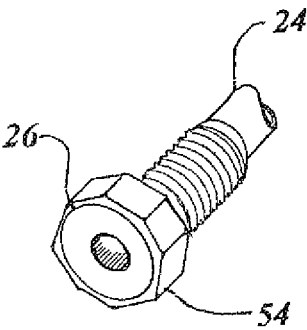
FIG. 25 is a fragmentary isometric view of a typical tire pressure inflation valve stem having a polygonal shaped distal end flange.

The tire pressure inflation valve distal end flange 26 configuration preferably has a round flange 50, as illustrated in FIG. 23; a hexagonal flange 52, as shown in FIG. 24; or a polygonal flange 54, as shown in FIG. 25. In the latter configurations, a resilient seal is simply dimensioned to fit onto an unobstructed area of the hexagonal flange 52 or polygonal flange 54.

The adapter 16 utilizes a hollow adapter collar 56, as shown in FIGS. 5 through 7, and has a configuration that partially surrounds and is internally retained by the distal end flange 26, as depicted in the cross-section of FIG. 3. This configuration has a cup-like shape with a bottom hole, with the adapter collar 56 having an inner diameter sufficient size to clear the outer edge of the distal end flange 26. The adapter collar 56 includes internal threads 58, also a clearance hole 60 within its bottom forming an inward-facing lip 62, as illustrated best in FIGS. 6 and 7.

The inward-facing lip 62 has a preferred thickness of 0.035 inches (0.09 cm), with a lip inside diameter 64 dimensioned to permit the inflation valve stem 24 to slide unrestricted within, and the lip 62 interfacing with the distal end flange 26 on a side facing the air valve core 34 proximal end. The adapter collar 56 may be formed of any suitable material such as reinforced thermoplastic, steel, aluminum, or the like, however it is preferably formed of brass.

A resilient O-ring 66 is positioned on an exposed surface of the distal end flange 26 contiguously engaging both the flange 26 and an inner surface of the adapter collar 56, as shown in the cross-section of FIG. 3. Preferably that the O-ring 66 has a nominal diameter of 0.25 inches (1.91 cm) for conventional valve stems that include a distal end flange 26, however the size may vary for other valve stems. The use of the O-ring 66 creates a secondary sealing function in the event the grommet 28 on the valve 22 produces a leak path from ambient to the pressurized area of the tire. The material of the O-ring 66 may be any type that is applicable to the application such as neoprene, styrene butadiene (SBR), ethylene propylene, polyurethane, butyl rubber or resilient thermoplastic resin.

The final element of the adapter 16 is a tire pressure monitoring cap 68 that incorporates integral external monitor mounting means 70, which can include any number of different embodiments compatible with conventional tire pressure monitors 20.

The cap 68, as illustrated in FIGS. 9 through 16, is threadably attached to the adapter collar 56 and is disposed above and compresses the O-ring 66 between the cap 68, collar 56 and end flange 26, as shown in the cross-section of FIG. 3. The cap 68 permits the tire pressure monitor 20 to be attached onto the cap 68, thereby providing the inflation valve 22 to be modified for use with the TPMS.

The tire pressure monitoring cap 68 in the preferred embodiment, as shown in FIGS. 9 through 11, is preferably formed of brass having threads on an outer diameter for mating with threads in the adapter collar 56. The cap 68 incorporates a raised rim $68^a$ on an inner surface having a diameter and thickness compatible with the O-ring 66, as illustrated in FIGS. 3 and 6.

The preferred embodiment of the external monitor mounting means 70, as shown in FIGS. 9 through 11, consists of an integral protruding round hollow stem 72 with flats on opposed sides. The means 70 also has a lateral air egress hole 74 therethrough and screw threads within the hollow of the stem 72 on a distal end, for mounting the monitor 20 with a threaded fastener 76, which is supplied with the monitor 20. Another variation of the external monitor mounting means 70 has the same configuration, as illustrated in FIGS. 9 through 11, except the flats are omitted, leaving the stem 78 round and hollow, as shown in FIG. 12.

Yet another variation of the external monitor mounting means 70, as shown in FIGS. 13 and 14, consists of a hollow radial dome with wrench flats on opposed sides 80 and centrally positioned screw threads 80 within the dome hollow. The threads 80 are for mounting the monitor 20 with a hollow threaded fastener 84, which is supplied with the monitor 20 and is used within the tire to detect and transmit tire pressure.

Still another variation of the external monitor mounting means 70, as shown in FIGS. 15 and 16, consists of the same hollow radial dome as described above, however without wrench flats 86 on opposed sides. In both embodiments the hollow radial dome 80 and 86 have a radius of at least 0.14 inches (0.36 cm).

A fifth variation of the external monitor mounting means 70, as illustrated in FIGS. 33 through 36 of the third embodiment, consists of a hollow round threaded stem 78$^a$ having external threads 78$^b$ on the distal end. The threaded stem 78$^a$ is similar to the threads on the valve stem 24, 24$^a$ and 24$^b$ for retaining the valve cap 36 and is adjacent to the lateral egress hole 74$^a$, as shown in FIGS. 33 through 36. The tire pressure monitor 20 contains mating female threads for physical attachment to the tire pressure monitoring cap 68 without requiring a threaded fastener.

During use, the adapter 16 is packaged in a kit that includes the adapter collar 56, the O-ring 66 and the cap 68 along with installation instructions. Where practical, the tire inflation valve 22 is alternatively combined in place with the adapter 16, thus forming a complete adapter assembly 18 ready for a tire pressure monitor 20 to be installed.

The second embodiment of the invention is illustrated in FIGS. 26 through 32, and FIGS. 5 through 21. The second embodiment is the same as the preferred embodiment except it utilizes a 540 series tire inflation valve instead of the 500 series, therefore the element descriptions used in common retain the same numerical designations in the drawings.

There are three exceptions of the designations taken for the 540 series tire inflation valve wherein the stem 24, is now designated 24$^a$ as it still retains the same basic shape with the only difference being that the distal end flange is slightly smaller in diameter which has no effect on its function or interface. FIGS. 26 through 29 illustrate the angled stem variation.

The second exception diverges from the preferred embodiment in that the resilient grommet 28 has a different configuration and replaces the original equipment manufacturer grommet with an aftermarket 540 series grommet 28$^a$. This replacement grommet 28$^a$ has a configuration duplicating the commercial 540 series grommet. However, it adds an integral outward-extending disc portion centrally positioned on an imaginary centerline. The disc portion has an outer diameter that is essentially the same as the outer diameter of the adapter collar 56 with a thickness of at least 0.020 inches (0.0508 cm), and is illustrated in FIGS. 30 through 32. The advantage of the aftermarket grommet 28$^a$ is that it adds integrity to the seal between the valve and the wheel rim, along with preventing electrolysis caused by dissimilar metals in contact with each other which in time could encourage air leakage from the tire.

The third deviation from the preferred embodiment is the use of the dished washer 30 and hex nut 32 which are replaced by a single hex nut 32$^a$ having a diametrical flat surface for contacting the grommet 28$^a$, as shown best in FIG. 29. Since the components remaining in the adapter assembly in this second embodiment are identical, its functionality is duplicated entirely.

The third embodiment of the invention is illustrated in FIGS. 33 through 39, and FIGS. 5 through 21. The third embodiment is the same as the preferred embodiment except it utilizes a 550 series tire inflation valve instead of the 500 series, therefore the element descriptions used in common retain the same numerical designations in the drawings.

There are three exceptions applicable to the 550 series tire inflation valve, wherein the stem, which is now designated 24$^b$, retains all of the same variations in shape with the only difference being that the distal end flange is slightly smaller in diameter which has no effect on its function or interface. FIGS. 33 through 36 illustrate the angled stem variation.

The second exception diverges from the preferred embodiment as the resilient grommet 28 has an entirely different configuration and completely replaces the original equipment manufacturer grommet with an aftermarket 550 series grommet 28$^b$. This replacement grommet 28$^b$ has a configuration duplicating the commercial 550 series grommet, and in addition adds an integral outward-extending disc portion. The disc portion has an outer diameter that is essentially the same as the outer diameter of the adapter collar 56 and has a thickness of at least 0.020 inches, as illustrated in FIGS. 37 through 39. The advantage of this aftermarket grommet 28$^b$ is that it adds integrity to the seal between the valve and the wheel rim, along with preventing electrolysis caused by dissimilar metals in contact with each other which in time could encourage air leakage from the tire.

The third deviation from the preferred embodiment is the use of the dished washer 30 and hex nut 32 which are replaced by a single hex nut 32$^b$ having an internal cone face for contacting the grommet 28$^b$, as shown best in the cross-section of FIG. 35.

The components remaining in the adapter assembly of the third embodiment are identical, therefore functionality is duplicated completely.

The fourth embodiment, as illustrated in FIGS. 40-52, utilizes the same tire inflation valve 22 along with its variations and exceptions for its stems 24 including the stems 38-44, grommet 28, dished washer 30, hex nut 32, air valve core 34, valve cap 36 and their sub-script variations, in the above described three embodiments.

The fourth embodiment incorporates an integral arm with the adapter and is designated as an integral arm adapter collar 100 having a configuration dimensioned to fit over the stem 24 and be internally retained by the distal end flange 26. The integral arm adapter collar 100 includes external monitor mounting means, with the adapter collar arm 120 providing an interface with a tire pressure monitor 20. The integral arm adapter collar 100 has a cup-like configuration having an inner diameter sufficient to clear the outside of the valve assembly distal end flange 26, and a clearance hole 160 that forms an inward-facing lip 162. The lip 162 also has an inner diameter that is dimensioned to allow the inflation valve stem 22 to slide unrestricted within. The lip 162 interfaces with the distal end flange 26 on a side facing the air valve core 34 proximal end, thereby permitting the inflation valve 22 to incorporate a tire pressure monitoring system monitor 20.

The integral arm adapter collar 100 includes an inward-stepped reduced outside diameter portion 121 adjacent to the inward-facing lip 162 for restriction clearance within a truck wheel 122. The external monitor mounting means of the integral arm adapter collar 100 consists of an integral arm 120 which extends outward, as shown in FIGS. 40-51, and incorporates a first mounting pad 124 having a mounting hole 126 therein. An opposed second mounting pad 128, also having a similar mounting hole 130 therein, is used for attachment of a specific tire pressure monitor 20 to a selected pad 124 or 128 according to the configuration of the tire pressure monitor 20 and type of truck wheel 122.

Figure 47:
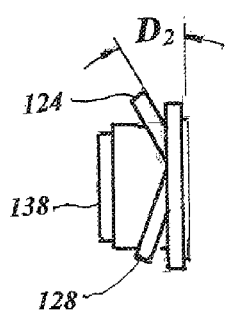
FIG. 47 is a left side view of the integral arm adapter collar in the fourth embodiment.
Figure 48:
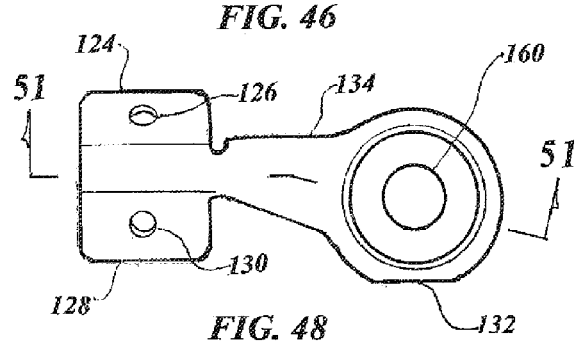
FIG. 48 is a top view of the integral arm adapter collar in the fourth embodiment.
Figure 49:
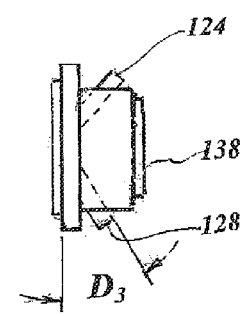
FIG. 49 is a right side view of the integral arm adapter collar in the fourth embodiment.
Figure 50:
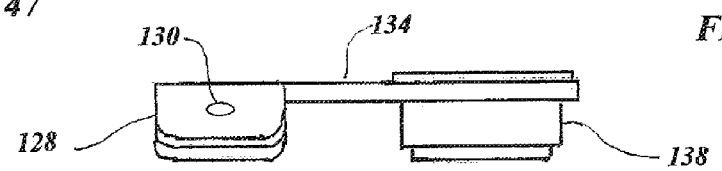
FIG. 50 is a bottom view of the integral arm adapter collar in the fourth embodiment.
Figure 51:
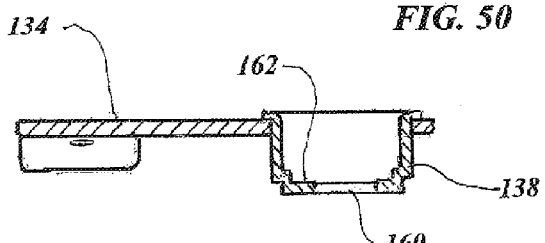
FIG. 51 is a cross-sectional view taken along lines 51-51 of FIG. 48.

The first mounting pad 124 is angled away from the integral arm 120 from 36 degrees to 39 degrees, preferably 38 degrees, designated as $D_2$ in FIG. 47, and the second mounting pad 128 is angled away from the integral arm 120 from 15 degrees to 17 degrees, preferably 16 degrees, designated $D_3$ in FIG. 49. The adapter collar 100 has a flat edge 132 essentially parallel with the integral arm 120 for restriction clearance within a truck wheel 122.

The arm 120 may be rotated to a lateral position on either side of the adapter collar 100 when installed, as illustrated in FIGS. 40 and 41, thereby allowing the a single arm 120 to be used on either a steel or an aluminum truck wheel 122 according to its orientation.

Figure 44:
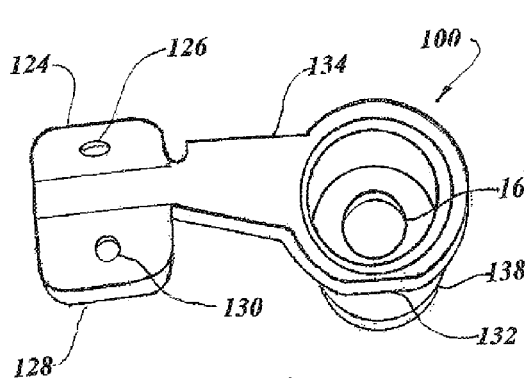
FIG. 44 is a partial isometric view of the integral arm inseparable from the collar in the fourth embodiment.
Figure 45:
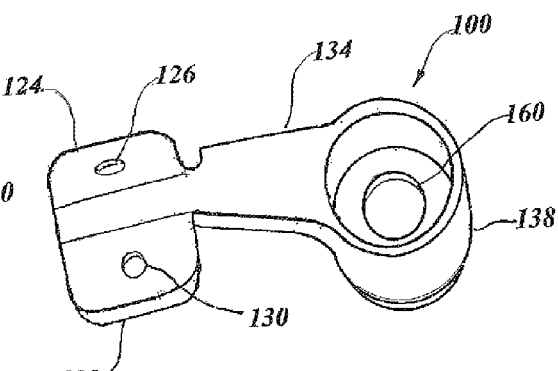
FIG. 45 is a partial isometric view of the integral arm collar investment cast or molded in the fourth embodiment.
Figure 46:
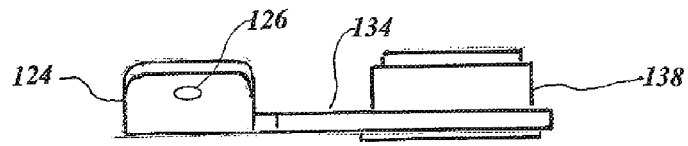
FIG. 46 is a top view of the integral arm adapter collar in the fourth embodiment.

The integral arm adapter collar 100 may be integral with the arm 120 inseparable from the collar, as illustrated in FIG. 44, by permanently securing the cup like collar 100 portion into the arm 120 by swaging, welding, brazing, bonding or other well known permanent attachment means. With this method of construction, an outward-extending flange 134 is located on the open end of the collar 100 which permits an extended surface for attachment and to act as a stop if swaging is used. The integral arm adapter collar 100 may be optionally formed by investment casting or molded of a metallic material.

Figure 52:
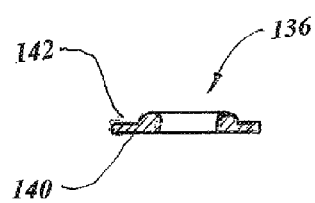
FIG. 52 is a cross-sectional view of the modified aftermarket grommet.

To prevent possible leaks, a modified aftermarket grommet 136 is glued onto the collar portion 138 of the adapter collar 100 for interfacing between the adapter collar 100 and a truck wheel 122. The grommet 136 is attached when series 540 or 550 truck valves are used and is not required with series 500 truck valves. The grommet 136, as shown in FIGS. 43 and 52, has a configuration with a flat face 140 on one side and a flat face with a raised radial inner portion 142 on the other side. The simplicity and multiple functions of the fourth embodiment, while using fewer components in the adapter assembly, achieves the same functionality as the other three embodiments.

While the invention has been described in detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. An adapter assembly for incorporating a tire pressure monitor onto a truck tire pressure inflation valve, wherein said assembly comprises:
   a) a truck tire pressure inflation valve, with the valve having a stem with a distal end flange,
   b) a hollow adapter collar having a configuration sized to fit over said stem and be internally retained by said distal end flange, said hollow adapter collar having external monitor mounting means, with the adapter collar providing an interface with said tire pressure monitor, said adapter collar further comprising a cup-like configuration with an inner diameter sufficient to clear the outer edge of said valve stem distal end flange, wherein said adapter collar having a clearance hole within an end forming an inward-facing lip, wherein the lip inner diameter is dimensioned to permit the inflation valve stem to slide unrestricted within, and the lip interfacing with the distal end flange on a side facing a valve core proximal end, thereby permitting said inflation valve to incorporate a tire pressure monitoring system (TPMS), and
   c) a modified aftermarket grommet fastened onto said adapter for interfacing between the adapter and a truck wheel, thus preventing possible minor leaks.

2. The adapter assembly as recited in claim 1 wherein said hollow adapter collar further comprises an inward-stepped reduced outer diameter adjacent to said inward-facing lip for restriction clearance within a truck wheel.

3. The adapter assembly as recited in claim 1 wherein said external monitor mounting means comprises an integral arm extending outward from said adapter collar, with a first mounting pad having a mounting hole therein, and an opposed second mounting pad having a mounting hole therein, for attachment of a specific tire pressure monitor to a selected pad according to the configuration of the tire pressure monitor and the type of truck wheel.

4. The adapter assembly as recited in claim 3 wherein said hollow adapter collar having said cup-like configuration with said clearance hole within an end forming an inward-facing lip, that is integrally formed with said arm extending outward from said adapter collar, with the arm being integral with the collar.

5. The adapter assembly as recited in claim 3 wherein said first mounting pad is angled away from the integral arm from 36-degrees to 39-degrees, and the second mounting pad is angled away from the integral arm from 15-degrees to 17-degrees, and the adapter collar has a flat edge essentially parallel with the integral arm for restriction clearance within a truck wheel.

6. The adapter assembly as recited in claim 1 wherein said modified aftermarket grommet has a flat face on one side, and a flat face with a raised radial inner portion on the other side.

7. The adapter assembly as recited in claim 1 wherein said hollow adapter collar having external monitor mounting means is investment cast or molded of a metallic material.

* * * * *